United States Patent
Qu et al.

(10) Patent No.: US 9,857,911 B1
(45) Date of Patent: Jan. 2, 2018

(54) BI-DIRECTIONAL SCALABLE INTRA-PANEL INTERFACE

(71) Applicant: Parade Technologies, Ltd., Grand Cayman (KY)

(72) Inventors: Ming Qu, San Jose, CA (US); Roel Coppoolse, Santa Clara, CA (US); Xiang Chen, Santa Clara, CA (US); Zhengyu Yuan, San Jose, CA (US)

(73) Assignee: PARADE TECHNOLOGIES, LTD., George Town, Grand Cayman (KY)

( * ) Notice: Subject to any disclaimer, the term of this patent is extended or adjusted under 35 U.S.C. 154(b) by 0 days.

(21) Appl. No.: 15/224,203

(22) Filed: Jul. 29, 2016

(51) Int. Cl.
*G06F 3/041* (2006.01)

(52) U.S. Cl.
CPC ................... *G06F 3/0416* (2013.01)

(58) Field of Classification Search
CPC .................. G06F 3/0416; G06F 3/0412
See application file for complete search history.

(56) References Cited

U.S. PATENT DOCUMENTS

| | | | |
|---|---|---|---|
| 8,031,094 B2 | 10/2011 | Hotelling et al. | |
| 8,547,317 B2 | 10/2013 | Lee | |
| 8,922,535 B2 | 12/2014 | Yang et al. | |
| 2012/0182223 A1 | 7/2012 | Zeng et al. | |
| 2012/0242628 A1* | 9/2012 | Yuan | G09G 3/20 345/204 |
| 2016/0012766 A1* | 1/2016 | Shin | G06F 3/0412 345/204 |
| 2016/0125840 A1* | 5/2016 | Oh, II | G09G 5/006 345/213 |
| 2016/0334934 A1* | 11/2016 | Mo | G02F 1/13338 |
| 2017/0031506 A1* | 2/2017 | Cho | G06F 3/0416 |
| 2017/0052635 A1* | 2/2017 | Yu | G06F 3/044 |
| 2017/0060328 A1* | 3/2017 | Kim | G06F 3/0416 |
| 2017/0068388 A1* | 3/2017 | Kim | G06F 3/044 |
| 2017/0090673 A1* | 3/2017 | Kim | G06F 3/0418 |
| 2017/0178562 A1* | 6/2017 | Hekmat | G09G 3/2096 |

OTHER PUBLICATIONS

Bae, S.H. et al., "Implementation of a High-Performance Touch Controller and Differential Sensing Circuit," International Journal of Computer and Information Technology, Nov. 2014, pp. 1177-1180, vol. 03, Issue 06.

* cited by examiner

*Primary Examiner* — Premal Patel
(74) *Attorney, Agent, or Firm* — Morgan, Lewis & Bockius LLP

(57) ABSTRACT

A touch panel display subsystem for bi-directional intra-panel communication includes a forward link and a backward link between a timing controller and one or more source drivers. The forward link includes a timing controller transmitter in the timing controller to receive video signal, video control signal and touch control signal, and to transmit over the forward link in the format of frame based packet, and a source driver receiver in the source driver to receive video signal, video control signal and touch control signal over the forward link. The backward link includes a source driver transmitter in the source driver to receive the touch sensor data and transmit the touch sensor data over the backward link when the backward link is enabled, and a timing controller receiver in the timing controller to receive the touch sensor data over the backward link when the backward link is enabled.

21 Claims, 3 Drawing Sheets

BI-DIRECTIONAL SCALABLE INTRA-PANEL INTERFACE

TECHNICAL FIELD

This application relates to an intra-panel interface of a display device, and in particular a bi-directional intra-panel interface for transmitting display data and touch data between a timing controller and one or more source drivers in a display device with a touch-sensitive surface.

BACKGROUND

A typical pixel based display includes numerous source drivers (also referred to as a column driver) that each of source drivers drives display data onto a specified column of a pixel array. A timing controller uses a timing controller-source driver interface to supply display and control data to the source drivers. Conventional timing controller-source driver interface, however, is not optimized to capture and process data from widely adopted multi-function pixel di splay panels.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
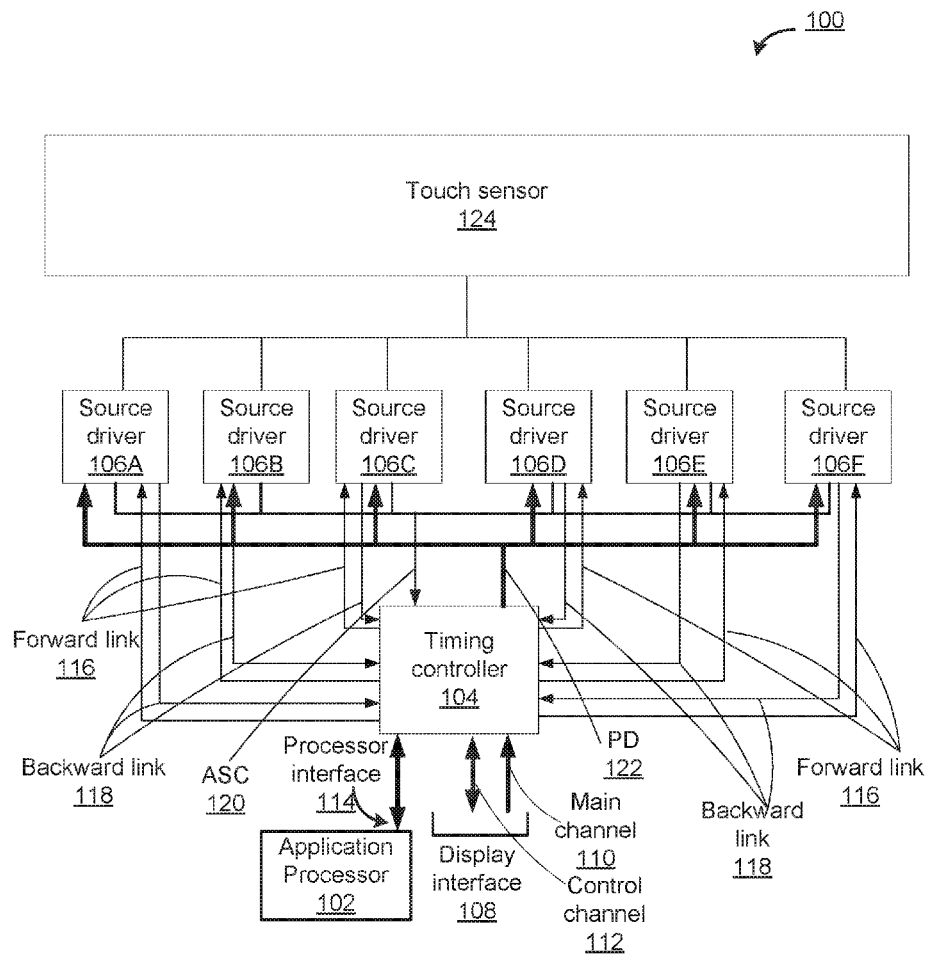
FIG. 1 is a block diagram illustrating a touch panel display subsystem with a bi-directional intra-panel communication between a timing controller and source drivers, in accordance with one embodiment.

FIG. 1 illustrates a touch panel display subsystem 100 including a timing controller 104, one or more source drivers 106, a forward link 116, a backward link 118, an auxiliary status channel (ASC) 120, a power management bus (PD) 122, and one or more touch sensors 124. The timing controller 104 receives display data and control data from a source device, and generates data signals to drive the display data and control data to source drivers 106. In the embodiment shown in FIG. 1, the timing controller 104 includes a display interface 108 for receiving the display data and control data, a processor interface 114, the ASC 120 and the PD 122, and a bi-directional scalable intra-panel interface (SIPI).

The display interface 108 receives display and control data from a source device for display on the touch panel display subsystem 100. The display data may include one or more combination of video, image data, and audio data of various formats. Control data includes address, timing, touch control information, and other control information used by the timing controller 104 to control the operation of the source drivers 106 or send touch data from one or more source drivers 106 to the timing controller 104. In one embodiment, display data and control information may be combined into a composite signal. For example, the composite signal may include multiple data packets, each packet carrying display data or control data. In one example, a source device is embodied in an integrated circuit, die, or computing device included within a system that includes the touch panel display subsystem 100. In another example, a source device is an external computing system, such as a set-top box, digital video disk player, or other external computing device that generates display and control data suitable to be received by the timing controller 104 over the display interface 108. In some embodiments, the display interface 108 is included in a graphics processing unit (GPU).

In one embodiment, the display interface 108 includes a main channel 110 and a control channel 112. The main channel 110 carries display data for display on the display panel. The control channel 112 enables bi-directional communication between each of the source drivers 106 and the timing controller 104. The control channel 112 carries control information used by the display data. Example control information includes training information, and test and debug information. The control channel 112 also carries status information, including data error rate as measured at one or a combination of the source driver 106 and the timing controller 104. In some embodiments, the control channel 112 carries control data used by the drive signals including vertical timing signals, such as vertical sync (VSYNC) or frame pulse (FP), and horizontal timing signals, such as horizontal sync (HSYNC) or line pulse (LP). The global timing signals also include display refresh signals for refreshing a displayed image, clock signals for operating gate drivers (not shown in FIG. 1), and clock signals and latch enable for operating source drivers 106.

The processor interface 114 included in the timing controller 104 supports bi-directional communication between an application processor 102 and the timing controller 104. The application processor 102 supports applications running in an operating system environment. Example applications include applications displaying content on the display panel for interaction with a user. For example, the application processor 102 interprets actions associated with interactions with content displayed in the display panel. Example actions may include navigation, content selection, or any other suitable action interacting with the display content. In some embodiments, the application processor 102 is combined with the display interface 108. For example, the application processor 102 may include an embedded in the GPU core having a display interface 108. In some embodiments, the timing controller 104 receives application data from the application processor 102 via the processor interface 114 and transmits touch sensor data received from one or more source drivers 106 to the application processor 102 for further processing. In some embodiments, the timing controller 104 receives one or more touch controller commands from an external processor via the processor interface 114 to regulate the transmission of touch sensor data from a source driver 106 to the timing controller 104, as further described in FIG. 2.

The ASC 120 included in the timing controller 104 is a single line communication link that enables the source drivers 106 to provide status information to the timing controller 104. Example status information includes link information such as symbol lock status or symbol error count. The ASC 120 is shared by multiple source drivers 106 through a multi-drop configuration. In one embodiment, a single ASC 120 connects all of the source drivers 106 in the touch panel display subsystem to a single timing controller 104. In another embodiment, multiple ASCs 120 may be used, with each ASC 120 connected to a subset of source drivers 106. In addition, multiple timing controllers 104 may be used to communicate with source drivers through multiple ASCs 120.

The PD 122 included in the timing controller 104 enables the timing controller 104 to send power control information to control the operation state of one or more source drivers 106.

The bi-directional SIPI included in the timing controller 104 includes a forward link 116 and a backward link 118 that each operate in accordance with the SIPI standard. The forward link 116 transmits display data and control data from the timing controller 104 to each source driver 106. The forward link 116 includes one or more data channels, each data channel embodied as a differential pair of conductors. In one embodiment, the one or more data channels are DC-coupled differential pairs with double termination. In some embodiments, the number of data channels included in the forward link 116 is scalable. In the embodiment shown in FIG. 1, the forward link 116 includes two data channels. The number of data channels may be greater than two to satisfy the maximum transmission throughput used for a specific implementation of the touch panel display subsystem 100.

The backward link 118 includes a single differential pair of signal conductors that transmit digital data from each source driver 106 to the timing controller 104. In some embodiments, the digital data transmitted over the backward link 118 includes touch sensor data received from the touch sensor 124. In one embodiment, the backward link 118 has similar electrical characteristics to a single channel of the forward link 116.

A source driver 106 receives multi-bit digital display data and control data from the timing controller 104 via the forward link 116, converts the display data to analog voltage levels, and provides the analog voltage levels to pixels in the display panel. The transmission path formed by the output of each source driver 106 to the input of each pixel in a specific column of pixels is referred to herein as an output channel or channel. A source driver 106 includes multiple output buffers, where each output buffer operates to rapidly charge the column line capacitance of the corresponding channel. The source driver 106 also receives touch sensor data from one or more touch sensors 124 and sends the received touch sensor data to the timing controller 104 via the backward link 118 for further processing. In the embodiment shown in FIG. 1, a group of source drivers 106 is coupled to a single touch sensor 124.

The touch sensor 124 measures physical interactions with a portion of the display panel into information describing location, position, force, and interaction duration information of the physical interaction with the display panel. For example, when an object (e.g., a finger) touches the display panel, the touch sensor 124 measures analog data indicating the physical interaction and the analog data is converted into digital data, in the source driver. The digital data is then transmitted to the timing controller 104 over the backward link 118 for further processing. Example touch information that can be extracted from the touch sensor 124 data includes position of the touch event relative to reference point on the display panel or device that includes the display panel, force applied on the display panel, and touching duration indicating the duration of the touch event. The touch sensor 124 may employ well-known methods, including resistive and capacitive elements to detect a touch event. In one embodiment, the touch sensors 124 are integrated with a transparent touch-sensitive material disposed on the display panel. Alternatively, the touch sensors 124 may be integrated into the display panel. The number of touch sensors 124 varies based on the size of the display area and the size of the touch sensors to detect interaction with any specified portion of the display panel. Each touch sensor 124 is coupled to a group of column drivers located physically proximate to the touch sensor 124.

Figure 2:
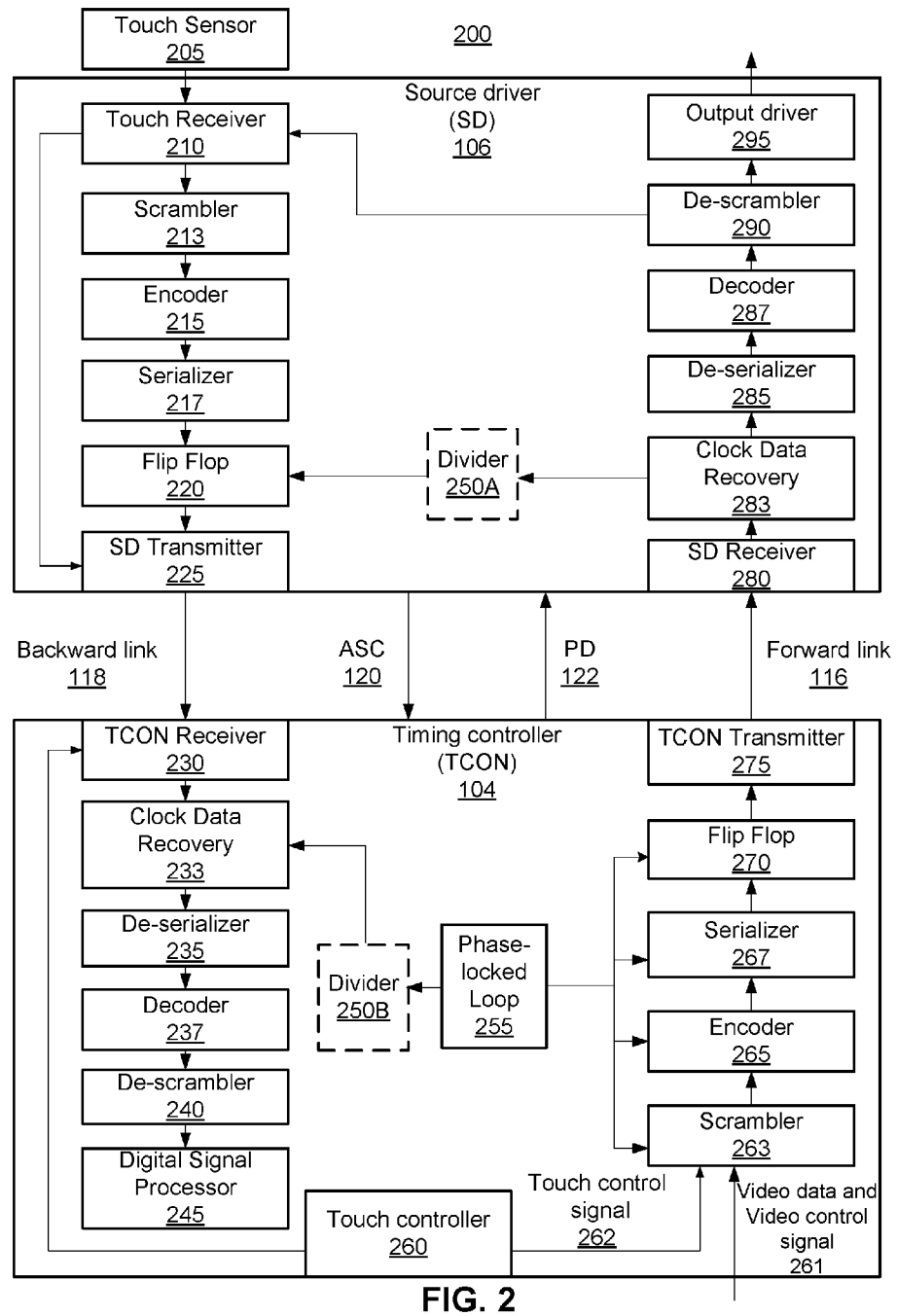
FIG. 2 illustrates a detailed view of a bi-directional timing controller and a source driver intra-panel interface for a touch panel display subsystem, in accordance with one embodiment.

FIG. 2 is a bi-directional timing controller 104 and a source driver 106 intra-panel interface for a touch panel display subsystem 100, in accordance with one embodiment. As described in FIG. 1, multiple source drivers 106 may be coupled to a timing controller 104, and multiple source drivers 106 may be coupled to a touch sensor 124. For simplicity, in FIG. 2, one timing controller 104, one source driver 106, and one touch sensor 205 are used to describe the forward link signal path and backward link signal bath. Similar signal paths may be employed to an implementation including multiple source drivers 106 and multiple touch sensors 205.

In the embodiment shown in FIG. 2, the timing controller 104 includes a forward link path and a backward link path. The forward link path includes a touch controller 260, a scrambler 263, an encoder 265, a serializer 267, a flip flop 270, and a timing controller transmitter 275. The touch controller 260 receives one or more touch controller commands from an external processor via the processor interface 114 and generates the touch control signal 262. The touch controller commands indicate an operation mode of the touch control signal 262. Examples of operation modes include an active operation mode, an idle operation mode, and a sleep operation mode. The active operation mode indicates the touch sensor 205 is active for detecting touch events. The idle operation mode indicates no touch event is detected within a threshold time value but the touch sensor 205 is still active for detecting incoming touch events. The sleep operation mode indicates the touch sensor 205 is powered off or at a low power state and no touch event is detected. In some embodiments, the touch controller command is used to determine that a transmission of touch sensor data is complete in the backward link path. In some embodiments, the touch controller 260 is external to the timing controller 104.

In some embodiments, the touch controller 260 generates a receiver control signal based on the one or more touch controller commands to enable or disable the timing controller receiver 230 included in the backward link path of the timing controller 104. For example, the touch controller 260 generates a receiver control signal having a first state to enable the timing controller receiver 230 to receive information from the source driver 106 over the backward link when a touch control command indicates the operation mode is an active operation mode. If the touch controller command indicates the operation mode is an idle or sleep operation mode, the touch controller 260 generates a receiver control signal having a second state to maintain the timing controller receiver 230 in a disabled state or cause the timing controller receiver 230 to change state to a disable state. The touch controller 260 may also generate a receiver control signal having a second state to disable the timing controller receiver 230 when a determination is made by the touch controller 260 that transmission of the touch sensor data from a source driver 106 over the backward link 118 is complete, as further described below.

In some embodiments, the touch control signal 262 includes a touch controller command to determine if a transmission of the touch sensor data received from the touch sensor 205 is complete. The touch controller command includes, among other information, and indication of an expected amount of touch sensor data to be received from the touch panel.

In some embodiments, the touch control signal 262 is a packet representing a multi-bit signal. The packet may be combined with other packets corresponding to video data and the video control signal 261 and forming the composite video signal. In some embodiments, the touch control signal 262 is transmitted over the forward link 116 to the source driver 106 during a vertical blanking period, or during an intra-frame pause.

In some embodiments, the touch controller 260 also generates calibration data for calibrating the operation of the touch sensor 205 and the display panel. In some embodiments, the calibration data is embedded in the touch control signal 262. Alternatively, the touch controller 260 sends calibration data over the forward link path to the source driver 106 via a different signal line.

In the timing controller 104, the scrambler 263 scrambles the composite video signal (e.g., video data and video control signal 261 and touch control signal 262) to generate scrambled composite data. The encoder 265 encodes the scrambled composite data to generate encoded composite data. The encoder 265 may employ various encoding schemes, including 8b/10b. The serializer 267 converts the encoded composite data into serial encoded composite data and sends the serial encoded composite data to the timing controller transmitter 275 via the flip flop 270. The scrambler 263, the encoder 265, the serializer 267, and the flip flop 270 receive a clock signal from the phase-locked loop (PLL) 255. In some embodiments, the clock signal is embedded in the composite video signal. The timing controller transmitter 275 converts the serial encoded composite data into differential serial encoded composite data, and transmits the differential serial encoded composite data to the source driver receiver 280 included in source driver 106 over the forward link 116.

In the embodiment shown in FIG. 2, the forward link components in the source driver 106 include a source driver receiver 280, a clock data recovery circuit 283, a de-serializer 285, a decoder 287, a de-scrambler 290, and an output driver 295. The source driver receiver 280 included in the source driver 106 converts the differential serial encoded composite data from the timing controller transmitter 275 via the forward link 116 into serial bit stream encoded composite data. The clock data recovery circuit 283 recovers the clock signal from the serial encoded composite data. The recovered clock generally has the same clock rate as the clock signal extracted from the composite video signal transmitted from the timing controller 104. For example, the recovered clock has the same clock rate as the clock signal output by the PLL 255 included in the timing controller 104. The de-serializer 285 receives serial encoded composite data output by the clock data recovery circuit 283 and converts the serial encoded composite data into a multi-bit parallel data signal. The decoder 287 receives the multi-bit parallel data signal from the de-serializer 285 and decodes encoded composite data to generate decoded composite data. The de-scrambler 290 de-scrambles the decoded composite data to generate descrambled composite data. In some embodiments, the descrambled composite data is the same as the composite video signal generated in the timing controller 104. The output driver 295 converts the digital video signal included in the descrambled composite data into analog voltage signals that represent the display data.

In the embodiment shown in FIG. 2, the backward link signal path in the source driver 106 includes a touch receiver 210, a scrambler 213, an encoder 215, a serializer 217, a flip flop 220, and a source driver transmitter 225. The touch receiver 210 receives touch sensor data from the touch sensor 205 and the touch control signal from the de-scrambler 290. In some embodiments, the touch receiver 210 compares the operation mode specified by the touch control signal with one or more settings data stored in the touch receiver 210 to determine whether to establish the backward link 118. Example settings may be a multi-bit value corresponding to an operation mode settings determined by the touch controller 260. If the touch receiver 210 determines that the received touch control signal indicates the active operation mode, the touch receiver 210 generates a transmitter control signal having a first state to enable the source driver transmitter 225 to establish the backward link 118. On the other hand, if the touch receiver 210 determines that the received touch control signal indicates an idle or sleep operation mode, the touch receiver 210 generates the control signal having a second state to disable the source driver transmitter 225 to disestablish the backward link 118 or maintain the backward link 118 in a disconnected state. Although not shown in FIG. 2, in some embodiments, the touch receiver 210 may also enable or disable other components included in the backward link of the source driver 106 in a similar manner with respect to the source driver transmitter 225.

When the backward link 118 is established, the touch receiver 210 receives the touch sensor data from the touch sensor 205, and converts the touch sensor data into analog voltage signals. In some embodiments, the touch receiver 210 also drives the touch sensor 205. For example, if the touch sensor 205 is a capacitive touch sensor (e.g., a mutual-capacitance touch sensor), the mutual-capacitance is an amount of electrical charges between two electrodes. The touch receiver 210 charges the electrodes to generate an electrical filed between the two electrodes. When an object (e.g., a finger, or an instrument) contacts the touch sensor 205 via the display panel, the object acts as another charge conducting electrode to cause the mutual-capacitance between the two electrodes to decrease. The touch receiver 210 receives the change of the mutual-capacitance as a touch signal and converts the touch signal into voltage signals for further processing.

The touch receiver 210 disables the source driver transmitter 225 if a transmission of the received touch sensor data is complete. In one example, the touch receiver 210 determines that the transmission of the received touch sensor data is complete using information received from the touch controller command. In one example, the received information indicates the expected amount of the touch sensor data to be transmitted by the touch sensor 205. The touch receiver 210 scans a corresponding touch panel to obtain touch sensor data. If the amount of the obtained touch sensor data matches the expected amount of touch sensor data indicated in the touch controller command, the touch receiver 210 disables the source driver transmitter 225. In some embodiments, the touch receiver 210 also disables other backward link components in the source driver 106 (e.g., the scrambler 213, the encoder 215 and the serializer 217) when a determination is made that the transmission of received touch sensor data is complete.

In the source driver 106, the scrambler 213, the encoder 215, the serializer 217, the flip flop 220, and source driver transmitter 225 each operate in manner similar to the corresponding circuits included in the forward path of the timing controller 104. The scrambler 213 receives the converted touch sensor data output by the touch receiver 210, and scrambles the touch sensor data and control signals from the touch receiver 210 to generate scrambled touch sensor data. The encoder 215 encodes the scrambled touch data to generate encoded touch sensor data. The serializer 217 converts the encoded touch data into serial encoded touch sensor data, and sends the serial encoded touch data to the source driver transmitter 225 via the flip flop 220. The flip flop 220 receives the recovered clock signal from the clock data recovery circuit 283 via the divider 250A and sends retimed touch sensor data signal to the source driver transmitter 225. The divider 250A performs a divide operation on the recovered clock to generate a divided recovered clock with a reduced clock rate (also referred to as a sub-rate) based on the divide ratio. The divide ratio of the divider 250A may be set to match the divide ratio of the divider 250B included in the timing controller 104. In other embodiments, the recovered clock is passed to the flip flop 220 without use of a divider 250A. The source driver transmitter 225 converts the retimed serial encoded touch sensor data into differential serial encoded touch sensor data and transmits the differential serial encoded touch sensor data over the backward link 118.

The backward link components in the timing controller 104 include a timing controller receiver 230, a clock data recovery circuit 233, a de-serializer 235, a decoder 237, a de-scrambler 240, and a digital signal processor 245. The timing controller receiver 230 included in the timing controller 104 receives the differential serial encoded touch sensor data and generates serial encoded touch sensor data. The touch controller 260 generates a receiver control signal having a second state to disable the timing controller receiver 230 to disestablish the backward link 118. Although not shown in FIG. 2, in some embodiments, the touch controller 260 may also disable other components (e.g., the timing controller receiver 230, the clock data recovery 233, the de-serializer 235, the decoder 237, the de-scrambler 240, and the digital signal processor 245) included in the backward link of the timing controller 104 in a similar manner with respect to the timing controller receiver 230.

The clock data recovery circuit 233 recovers the clock signals from the serial encoded touch data using the clock signal from the PLL 255 via the divider 250B. The touch sensor data output by the clock data recovery circuit 233 is retimed at the same clock rate of the clock output by the PLL 255, which matches the clock rate of the touch sensor data transmitted by the source driver transmitter 225 over the backward link 118. The de-serializer 235 converts the retimed serial encoded touch sensor data into multi-bit parallel encoded touch sensor data. The decoder 237 decodes the multi-bit parallel encoded touch sensor data to generate decoded touch data. The de-scrambler 240 de-scrambles the decoded touch sensor data to generate descrambled touch sensor data. The digital signal processor 245 (also referred to as a touch signal processor) processes the touch sensor data for further analysis. For example, the digital signal processor 245 analyzes the received touch sensor data to create a touch event by determining touching position, touching force applied on the display panel, angle of the touching force, magnitude of the touching force, touching duration, and other types of the touch events. Touch sensor data may also include information indicating the type of instrument involved in the touch event, such as finger, glove, pen or other instrument applied on the display panel. In some embodiments, the digital signal processor 245 performs initial process of the touch sensor data. The initial process of the touch sensor data includes filtering out some unwanted components or features of the touch sensor data, enhancing some components or features of the touch sensor data, compressing or downsampling the touch sensor data, or other suitable process used for digital signal processing. The digital signal processor 245 transmits the processed touch sensor data to the touch controller 260 for creating the touch event. In some embodiments, the digital signal processor 245 is embedded in the touch controller 260. After the touch sensor data is processed, the touch controller 260 transmits the processed touch sensor data to the application processor 102 (not shown in FIG. 2).

Figure 3:
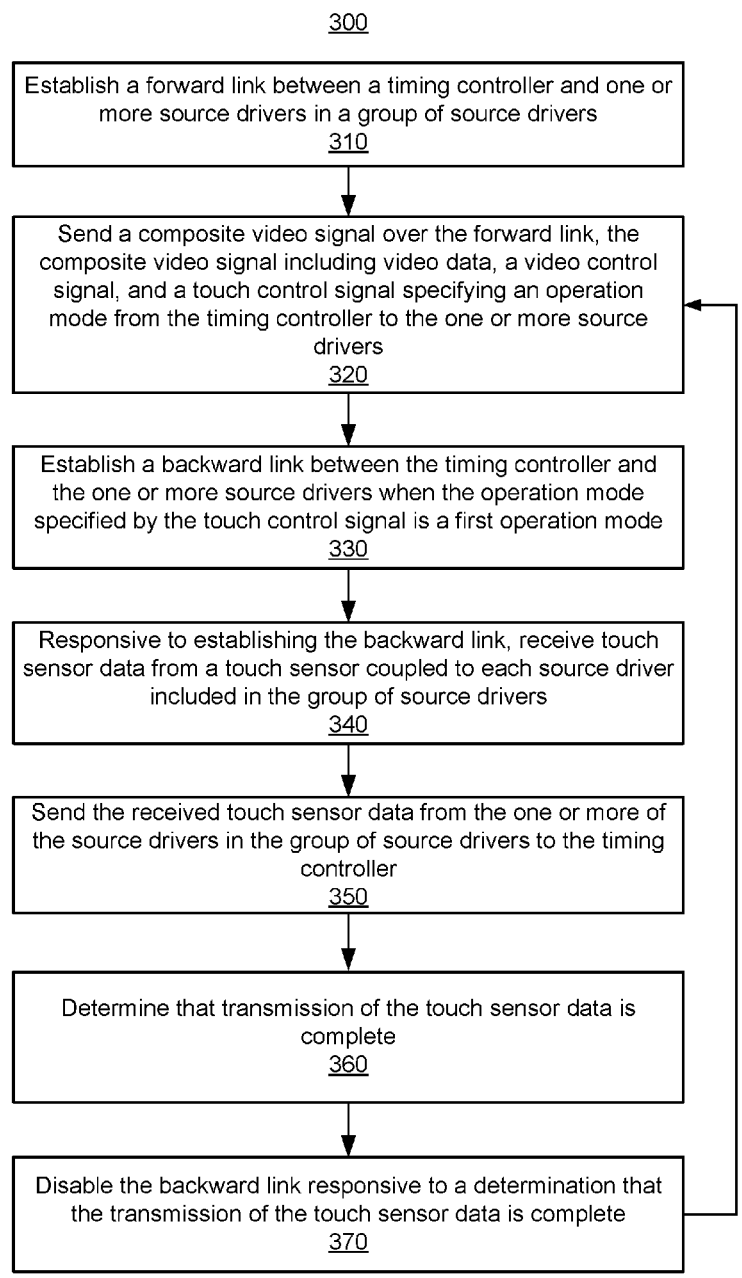
FIG. 3 illustrates a flowchart of one implementation of a process for bi-directional intra-panel communication between a timing controller and one or more source drivers in a touch panel display subsystem, in accordance with one embodiment.

FIG. 3 is a flowchart illustrating a process for bi-directional intra-panel communication between a timing controller and one or more source drivers in a touch panel display subsystem, in accordance with one embodiment. The process 300 may be performed by the touch panel display subsystem 100 in some embodiments. Alternatively, other components may perform some or all of the steps of the process 300. Additionally, the process 300 may include different or additional steps than those described in conjunction with FIG. 3 in some embodiments or perform steps in different orders than the order described in conjunction with FIG. 3.

The touch controller 260 establishes 310 a forward link 116 between a timing controller 104 and one or more source drivers 106 in a group of source drivers 106. To establish the forward link 116, the touch controller 260 enables the timing controller transmitter 275 included in the forward link path of the timing controller 104 to communicate video data, video control information, and touch control signals to the source driver receiver 280 included in the forward link path of the source driver 106. This process is repeated for each source driver 106 coupled to the timing controller 104.

When the forward link 116 is established, the timing controller transmitter 275 sends 320 a composite video signal from the timing controller 104 to the source driver receiver 280 included in one or more source drivers over one or more forward links 116. The touch control signal 262 specifying an operation mode and video data and control signals 261 may be combined into a composite video signal.

The touch controller 260 establishes 330 the backward link 118 between the timing controller 104 and the one or more source drivers 106 when the operation mode specified by the touch control signal is a first operation mode. The first operation mode is an active operation mode. For example, the touch controller 260 generates a receiver control signal having a first state to enable the timing controller receiver 230 and the touch controller 260 sends the touch control signal from the timing controller 104 to each source driver 106 to enable the touch receiver 210 included in each source driver 106 to receive touch sensor data from a touch sensor 205 coupled to each source driver and to enable the source driver transmitter 225 in each source driver.

When the backward link 118 is established, the touch receiver 210 receives 340 touch sensor data from a touch sensor 205 coupled to each source driver 106 included in the group of source drivers 106.

The source driver 106 sends 350 the received touch sensor data over the backward link 118 to the timing controller 104. Touch sensor data captured by the touch receiver 210 in each source driver 106 is passed to a source driver transmitter 225 coupled to a backward link 118. The source driver transmitter 225 transmits the touch sensor data over the backward link 118 to the timing controller receiver 230 in the timing controller 104 for further processing by additional components included in the backward link path of the timing controller 104.

The touch controller 260 determines 360 whether the transmission of the received touch sensor data is complete. When the touch receiver 210 in each source driver 106 receives touch sensor data matching the expected amount of the touch sensor data specified in the touch controller command sent by the touch controller 260, the transmission of the touch sensor data is determined to be complete.

The touch receiver 210 disables 370 the backward link signal path in each source driver 106 and the touch controller 260 disables 370 the backward link signal path in the timing controller 104 responsive to a determination that the transmission of the received touch sensor data is complete. For example, the touch receiver 210 in each source driver 106 disables the source driver transmitter 225 in each source driver 106 or other components in the backward link signal path in each source driver 106. The source driver transmitter 225 in each source driver 106 transmits the touch sensor data from each source driver 106 to the timing controller receiver 230 in the timing controller 104. The timing controller receiver 230 transmits the touch sensor data to the digital signal processor 245 for further processing. The touch controller 260 then disables the timing controller receiver 230.

The disclosed bi-directional scalable intra-panel interface allows bi-directional digital data transmission between a timing controller and one or more source drivers. In one embodiment, a touch receiver is included in the one or more source drivers, and a digital signal processor is included in the timing controller. In such a configuration, the touch controller can be embedded in the timing controller to simplify system design and to save cost. The backward control signal (e.g., a touch control signal) may be combined with video data into a composite video signal and transferred from the timing controller to the one or more source drivers via a forward link. Thus, no separate backward link control channel is needed. Moreover, both forward link and backward link include scramblers and encoders to reduce disturbances that affect the forward link and the backward link. The touch sensor data is transmitted to the timing controller over the backward link at a clock rate derived from the clock extracted from the composite video signal, therefore, no extra PLL is needed in the backward link path.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion embodied as executable instructions or code) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The phrase "in one embodiment" in various places in the specification is not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a bi-directional scalable intra-panel interface disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope described.

What is claimed is:

1. A method for intra-panel communication, the method comprising:
    establishing a forward link between a timing controller and one or more source drivers in a group of source drivers;
    transmitting, from the timing controller to the one or more source drivers over the forward link, a composite video signal, the composite video signal comprising video data, a video control signal, and a touch control signal specifying an operation mode of a backward link between the timing controller and the one or more source drivers;
    establishing the backward link when the operation mode specified by the touch control signal has a first operation mode;
    receiving touch sensor data from a touch sensor, the touch sensor coupled to each source driver included in the group of source drivers;
    transmitting, over the backward link, the received touch sensor data from the one or more source drivers in the group of source drivers to the timing controller; and
    disabling the backward link in response to a determination that the transmitting of the received touch sensor data is complete.

2. The method of claim 1, further comprising transmitting the touch control signal over the forward link to the one or more source drivers during a vertical blanking period.

3. The method of claim 1, further comprising transmitting the touch control signal over the forward link to the one or more source drivers during an intra-frame pause.

4. The method of claim 1, wherein the first operation mode is an active operation mode.

5. The method of claim 1, further comprising maintaining the backward link in a disconnected state when the touch control signal has a second operation mode representing an idle operation mode.

6. The method of claim 1, wherein transmitting, over the backward link, the received touch sensor data from the one or more source drivers in the group of source drivers to the timing controller further comprises:
    extracting a clock signal from the composite video signal; and
    transmitting the received touch sensor data to the timing controller over the backward link at a clock rate derived from the clock extracted from the composite video signal.

7. The method of claim 6, wherein the clock rate is the same rate or sub-rate of the clock signal extracted from the composite video signal.

8. The method of claim 6, further comprising scrambling the touch sensor data using a scrambler included in a backward link signal path of the one or more source drivers.

9. The method of claim 1, wherein disabling the backward link further comprises:
    generating a descrambled composite video signal by a de-scrambler circuit included in forward link signal path of the one or more source drivers, the descrambled composite video signal comprising the touch control signal;
    receiving, by a touch receiver included in a backward link signal path of the one or more source drivers, the touch control signal; and
    disabling the touch receiver when the touch control signal specifies a second operation mode representing an idle operation mode.

10. The method of claim 9, further comprising disabling a transmitter included in the backward link path of the one or more source drivers when the touch control signal specifies the second operation mode.

11. The method of claim 9, further comprising:
    receiving, by a receiver included in a backward link path of the timing controller, the touch control signal; and disabling the receiver included in the backward link path of the timing controller when the touch control signal specifies the second operation mode.

12. The method of claim 1, wherein disabling the backward link responsive to a determination that the transmitting of the received touch sensor data is complete comprises:
    receiving a touch controller command indicating an expected amount of touch sensor data to be transmitted by the touch sensor;
    retrieving, by a touch receiver, the touch sensor data;
    comparing an amount of retrieved touch sensor data to the expected amount of touch sensor data; and
    disabling the backward link when the amount of retrieved touch sensor data equals the expected amount of touch sensor data.

13. A system for intra-panel communication, the system comprising:
    a forward link comprising:
        a timing controller transmitter included in a timing controller, the timing controller transmitter configured to:
            receive a composite video signal, the composite video signal comprising video data, a video control signal, and a touch control signal, and
            transmit the touch control signal over the forward link, and
        a source driver receiver included in a source driver coupled to receive the composite video signal from the timing controller transmitter over the forward link; and
    a backward link comprising:
        a touch receiver included in the source driver, the touch receiver coupled to receive touch sensor data from a touch sensor, and configured to enable the backward link in accordance with an operation mode specified by the touch control signal;
        a source driver transmitter included in the source driver, the source driver transmitter configured to receive touch sensor data from the touch receiver, and transmit the touch sensor data over the backward link when the backward link is enabled, and
        a timing controller receiver included in the timing controller coupled to receive the touch sensor data from the source driver transmitter over the backward link when the backward link is enabled.

14. The system of claim 13, wherein the forward link operates in accordance with a scalable intra-panel interface format.

15. The system of claim 13, wherein the forward link further comprises:
    a touch controller configured to:
        receive one or more touch controller commands from an external processor and generate the touch control signal; and
        generate a receiver control signal based on the one or more touch controller commands.

16. The system of claim 15, wherein the touch controller is further configured to enable the timing controller receiver when the one or more touch controller commands indicates the operation mode specified by the touch control signal has a first operation mode.

17. The system of claim 15, wherein the touch controller is further configured to disable the timing controller receiver when the one or more touch controller commands indicates the operation mode specified by the touch control signal has a second operation mode.

18. The system of claim 13, wherein the source driver comprises:
    a clock data recovery circuit coupled to receive an output of the source driver receiver and configured to generate a recovered clock, the source driver transmitter transmitting the touch sensor data at a clock rate based on the recovered clock.

19. The system of claim 13, wherein the touch receiver is configured to enable the source driver transmitter when the operation mode specified by the touch control signal has a first operation mode.

20. The system of claim 13, wherein the touch receiver is configured to disable the source driver transmitter when the operation mode specified by the touch control signal has a second operation mode.

21. The system of claim 13, wherein the timing controller further comprises a touch signal processor coupled to receive the touch sensor data from the touch receiver when the touch receiver is enabled.

* * * * *